United States Patent [19]

Kao

[11] Patent Number: 5,433,504
[45] Date of Patent: Jul. 18, 1995

[54] ADJUSTING MECHANISM FOR A BICYCLE SEAT POST

[76] Inventor: Cheng-Hsien Kao, 83, Chung Shan Rd., Tu Cheng City, Taipei Hsien, Taiwan

[21] Appl. No.: 264,336

[22] Filed: Jun. 23, 1994

[51] Int. Cl.6 .............................. B62J 1/02; B62J 1/04
[52] U.S. Cl. .................... 297/215.15; 403/391
[58] Field of Search ................... 297/195.1, 215.15; 403/97, 396, 391, 389

[56] References Cited

U.S. PATENT DOCUMENTS

| | | | |
|---|---|---|---|
| 3,992,054 | 11/1976 | Campagnolo | 297/215.15 |
| 4,614,452 | 9/1986 | Wang | 403/97 X |
| 5,295,727 | 3/1994 | Kao | 403/391 X |

Primary Examiner—Peter R. Brown
Assistant Examiner—Anthony Barfield
Attorney, Agent, or Firm—Bacon & Thomas

[57] ABSTRACT

An adjustment mechanism for a bicycle seat includes a supporting post which has a circular rib support at top. At the outer wall and adjacent to each side of the rib support, a flat portion is disposed. Each flat portion is provided with a circular slot having teeth. A passage is provided at the flat portion between the rib support and the slot. A saddle bracket is pivoted to the seat post by a bolt in such a manner that the ceiling of the top of the saddle bracket is supported by the rib support and the projections of the lower end of the saddle bracket are engaged with the teeth of the slots. The inner walls of the saddle bracket are provided with retaining channels for receiving the supporting rod of the seat.

3 Claims, 3 Drawing Sheets

ADJUSTING MECHANISM FOR A BICYCLE SEAT POST

BACKGROUND OF THE INVENTION (a) Field of the Invention

This invention relates to an adjusting mechanism, more particularly, to an adjusting mechanism for the seat post of a bicycle. The adjusting mechanism includes a clamp which is slidable within the supporting post. By this arrangement, the seat which is disposed onto the seat post can be readily adjusted angularly.

(b) Description of the Prior Art

There are several designs on the configuration of the seat post. For example, by combination of an arcuate supporting socket and a pair of clamps, the supporting rod of the seat can be fixed and the adjustment of the seat can be done.

On the other hand, there are some seat post which include a combination of an adjusting shaft, a locking stud, a bolt and locking collar or an adjusting shaft, a pair of clips and a supporting rod.

U.S. Pat. No. 4,783,119, issued on Nov. 8, 1988, discloses an adjustable seat post which provides a cross pin 25 which has two holes 9. A rocker 3 is attached to the post 1 through the provisions of a pair of clamps 20 and a pair of bolts 30. By adjusting the bolts 30, the rocker 3 can be adjusted angularly to adjust the seat.

SUMMARY OF THE INVENTION

It is the object of this invention to provide an adjustable mechanism for the seat post of a bicycle which facilitates an easy adjustment of the seat attached to the adjustable mechanism.

In order to achieve the object set forth, the adjustable mechanism includes a supporting post which has a circular rib support at the top. At the outer wall and adjacent to each side of said rib support, a flat portion is disposed. Each flat portion is provided with a circular slot having a teeth. A passage is provided at the flat portion between the rib support and the slot. A saddle bracket is pivoted to the seat post by a bolt in such a manner that the ceiling of the top of the saddle bracket is supported by said rib support and the projection of the lower end of the saddle bracket is engaged with the teeth of the slot of the flat portion. The inner wall of the saddle bracket is provided with a retaining channel for receiving the supporting rod of the seat. Accordingly, the seat which is disposed onto the saddle bracket may be readily adjusted.

BRIEF DESCRIPTION OF THE DRAWINGS

The structural and operational characteristics of the present invention and its advantages as compared to the known state of the prior art will be better understood from the following description, in conjunction with the attached drawings which show illustratively but not restrictively an example of an adjusting mechanism for the seat post of a bicycle. In the drawings.

DETAILED DESCRIPTION OF THE PREFERRED EMBODIMENTS

Figure 1:
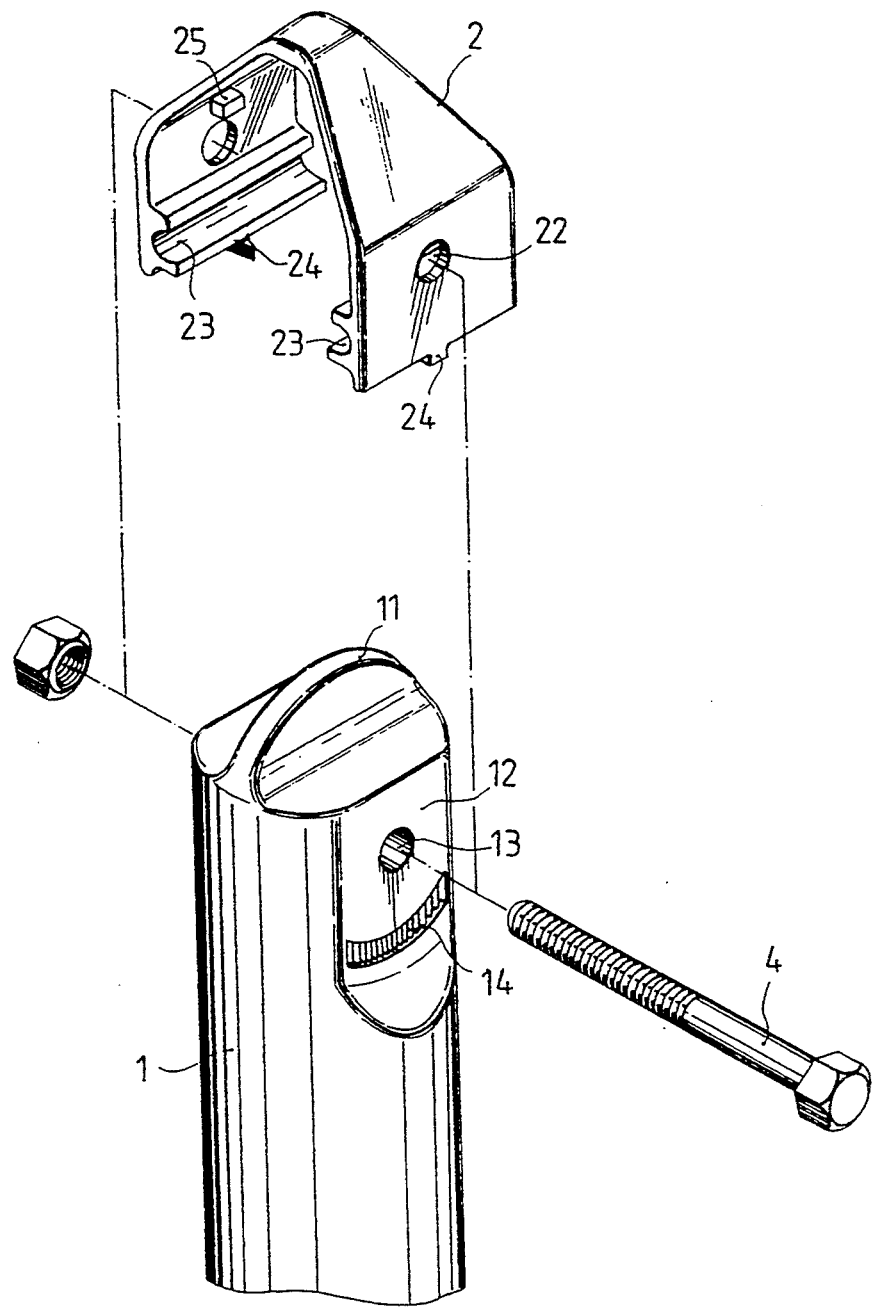
FIG. 1 is an exploded perspective view of the adjusting mechanism of a seat post made according to this invention.
Figure 2:
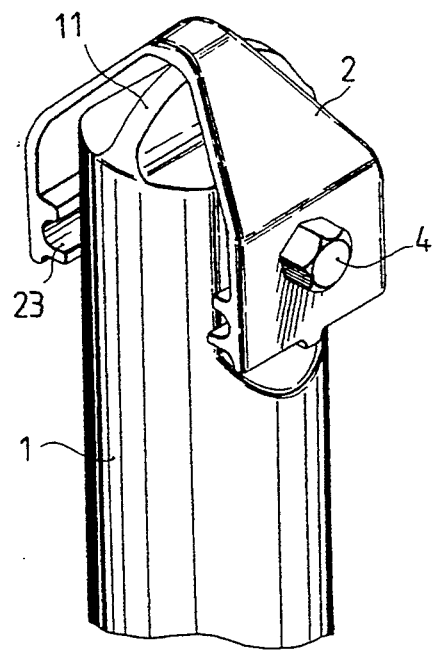
FIG. 2 is a perspective view of the assembled adjusting mechanism.

Referring to FIG. 1, the adjusting mechanism for a seat post includes a supporting post 1 and a saddle bracket 2. By this arrangement, the a seat mounted onto the saddle bracket 2 may be adjusted angularly.

The supporting post 1 has a circular rib support 11 at its top. The curvature of the rib support 11 is specially arranged to accommodate the adjustment of the seat. In order to reduce the cost of the rib support 11, the rib support 11 can be directly made from a plate, as shown in FIG. 1. This rib support 11 can also has another shape suitable for facilitating the adjustment of a seat mounted thereon. At the outer wall and adjacent to each side of said rib support 11, a flat portion 12 is disposed. Each flat portion 12 is provided with a toothed circular slot 14. A passage 13 is provided at the flat portions 12 between the rib supports 11 and the slots 14.

A saddle bracket 2 is pivotally secured to the supporting post 1 by a bolt 4 in such a manner that the ceiling 21 of the top of the saddle bracket 2 is supported by said rib support 11 and the pair of opposed projections 24 of the lower end of the saddle bracket 2 are engaged with the teeth 141 of the slots 14 of the flat portions 12. The inner opposed walls of the saddle bracket 2 are each provided with a retaining channel 23 for receiving the supporting rod 3 of the seat 5, as clearly shown in FIGS. 3 and 4. The saddle bracket 2 includes a pair of through holes 22 which are coaxillay in line with the passage 13 of the supporting post 1. By this arrangement, the saddle bracket 2 can be pivotally mounted to the supporting post 1.

Figure 3:
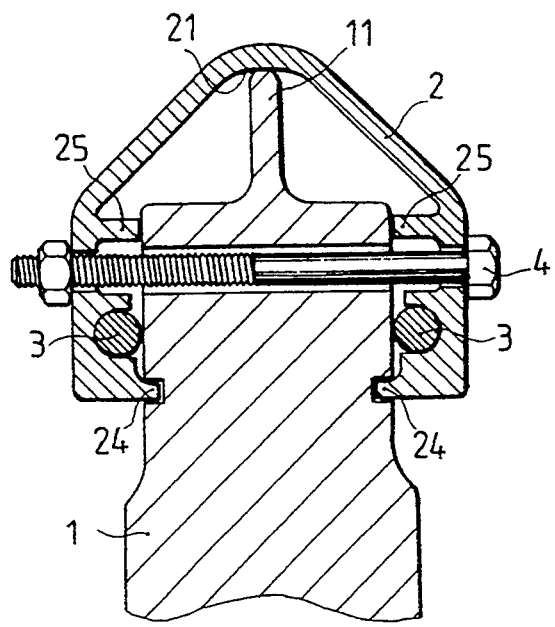
FIG. 3 is a cross sectional view of the adjusting mechanism shown in FIG. 2.
Figure 4:
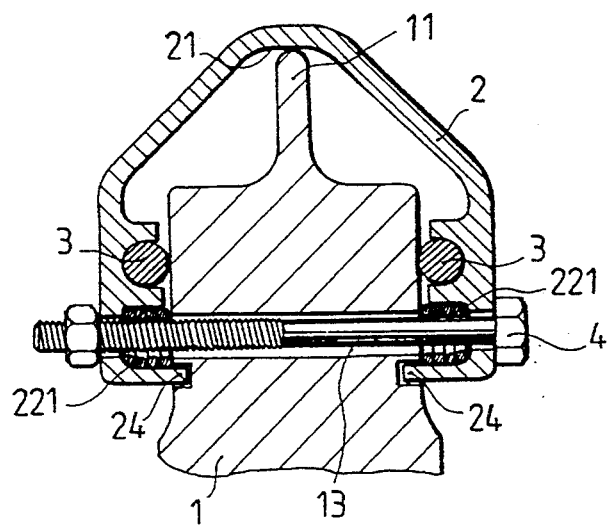
FIG. 4 is a cross sectional view similar to FIG. 3, but showing a second embodiment of the adjusting mechanism made according to this invention.

As clearly shown in FIG. 3 and 4, each inner wall of the saddle bracket 2 is provided with a rigid stud 25 adjacent to the hole 22. By this arrangement, the rigid stud 25 provides a strong support for the bolt 4. When the bolt and the nut assembly 4 is locked up, the ceiling 21 of the saddle bracket 2 is supported by the rib support 11 and the rigid stud 25 and the projections 24 are pressed against the flat portions 12 and the teeth 141 of the slots 14. Accordingly, the saddle bracket 2 can be adjusted to any desired angle.

As shown in FIG. 4, there is depicted a second embodiment of the adjusting mechanism. In this embodiment, the retaining slots 14 are arranged closer to the holes 22. The inner side of each hole 22 is provided with a coil spring 221. When the saddle bracket 2 is mounted to the supporting post 1, the bolt 4 passes through the holes 22, the coil springs 221 and the passage 13. By this arrangement, when the nut and the bolt 4 is loosened, the coil springs 221 will expand the saddle bracket 2 outwardly such that the projections 24 are released from the teeth 141 of the slots 14, and the saddle bracket 2 can be readily adjusted to a desired angle.

In assembling, the saddle bracket 2 can be pivotally mounted to the supporting post 1 by means of the bolt 4 which passes through the holes 22 of the saddle bracket 2. Besides, before the bolt 4 is locked up, each supporting rod 3 of the seat 5 is disposed within a retaining channel 23 at each inner wall of the saddle bracket 2. Besides, while mounting the saddle bracket 2 to the supporting post 1, the projections 24 of the saddle bracket 2 are engaged by the teeth 141 of the slots 14. Accordingly, the saddle bracket 2 can be retained and locked at a desired angle.

Figure 5:
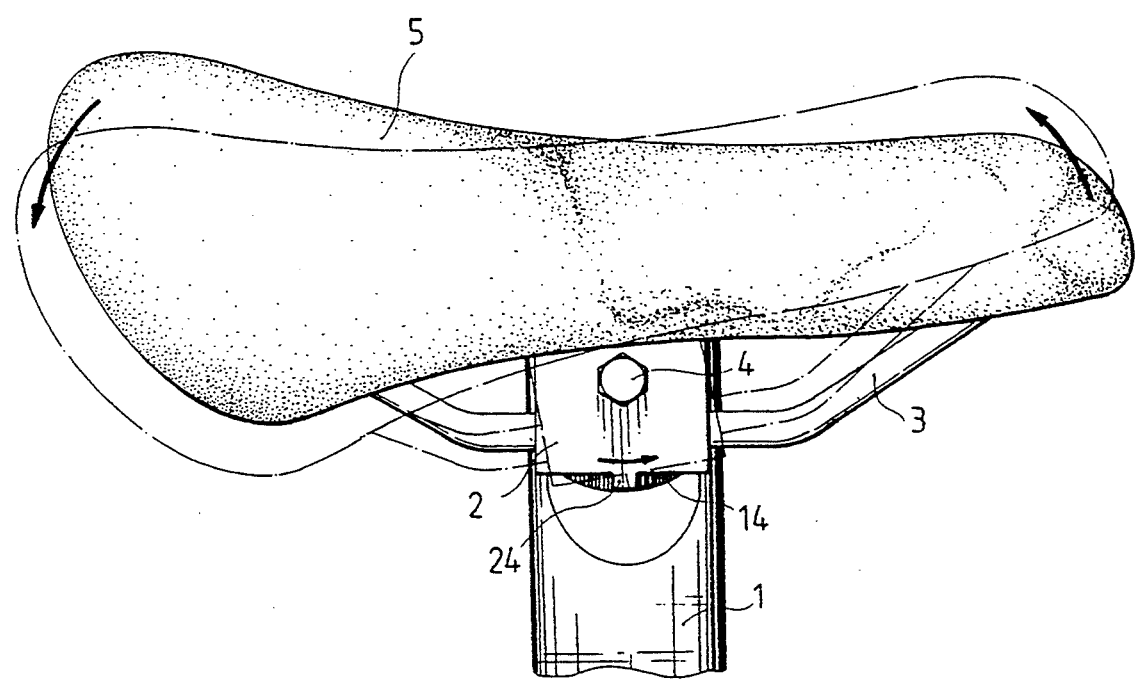
FIG. 5 is a sketch view showing a seat mounted onto the adjusting mechanism.

On the other hand, when the seat 5 needs to be adjusted to a new angle, as clearly shown in FIG. 5, the nut and bolt 4 can be loosened in such a manner that the projections 24 are released from the teeth 141 of the slots 14. Then the saddle slot 2 is ready to adjust to a new angle.

From the above description, the saddle bracket 2 can be readily adjusted by means of the bolt and the nut assembly 4. The cyclist can easily facilitate this adjustment by a single tool.

Although the present invention has been described in connection with the preferred embodiments thereof, many other variations and modifications will now become apparent to those skilled in the art without departing from the scope of the invention. It is preferred, therefore, that the present invention not be limited by the specific disclosure herein, but only by the appended claims.

I claim:

1. An adjusting mechanism for a bicycle seat post comprising:
   a) a supporting post including a longitudinal axis, a circular rib at a top of the post, a pair of flat portions disposed on opposite sides of the supporting post at an upper portion and located below the rib, each flat portion provided with a circular toothed slot formed therein, and a passage extending through the flat portions for receiving a bolt therethrough, the passage including a longitudinal axis perpendicular to the longitudinal axis of the post;
   b) a saddle bracket including a top portion and a pair of opposed side walls extending downwardly from the top portion, each side wall provided with an inner surface with a retaining channel for receiving a supporting rod of a bicycle seat, each said inner surface also having an inwardly directed projections for engaging the toothed slot of the post and each said side wall including a hole therethrough, with the holes of the side walls being coaxially alignable with the passage of the post for receiving the bolt therethrough; and
   c) a bolt for pivotally securing the saddle bracket to the supporting post and urging the projections within the toothed slots; and
   d) whereby when the bolt is loosened, the bracket may be pivoted on the circular rib to dispose the bracket at a desired angle with respect to the post and thereafter maintained at such angle when the bolt is tightened.

2. The adjusting mechanism of claim 1 wherein each inner surface of the side walls of the saddle bracket further includes an inwardly directed rigid stud for bracing the saddle bracket against the supporting post when the bolt is tightened.

3. The adjusting mechanism of claim 1 further including a coil spring sleeved on to the bolt adjacent each hole for urging the side walls outwardly to release the ratchets from the teeth of the slots when the bolt is loosened.

* * * * *